US009960945B2

(12) United States Patent
Joung et al.

(10) Patent No.: US 9,960,945 B2
(45) Date of Patent: May 1, 2018

(54) METHOD OF PROCESSING WCDMA SIGNAL TIMING OFFSET FOR SIGNAL ANALYZING EQUIPMENT

(71) Applicant: INNOWIRELESS CO., LTD., Seongnam-si, Gyeonggi-do (KR)

(72) Inventors: Jin Soup Joung, Seongnam-si (KR); Joo Hyeong Lee, Seoul (KR); Yong Hoon Lim, Seoul (KR); Kyoung Hwan Ju, Suwon-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 167 days.

(21) Appl. No.: 15/050,078

(22) Filed: Feb. 22, 2016

(65) Prior Publication Data

US 2017/0237597 A1    Aug. 17, 2017

(30) Foreign Application Priority Data

Feb. 17, 2016 (KR) .................. 10-2016-0018315

(51) Int. Cl.
*H04B 1/7073* (2011.01)
*H04B 1/7087* (2011.01)
(Continued)

(52) U.S. Cl.
CPC ....... *H04L 27/2656* (2013.01); *H04B 1/7073* (2013.01); *H04B 1/7087* (2013.01);
(Continued)

(58) Field of Classification Search
CPC ................ H04B 1/7073; H04B 1/7075; H04B 1/70751; H04B 1/70752; H04B 1/70755;
(Continued)

(56) References Cited

U.S. PATENT DOCUMENTS 5,345,439 A * 9/1994 Marston ................. H04B 7/216
370/210
5,592,480 A * 1/1997 Carney ................ H04B 7/2646
370/347
(Continued)

FOREIGN PATENT DOCUMENTS

EP     1855388 A1 * 11/2007  ......... H04B 1/70735
EP     1947784 A2 *  7/2008  ........... H04B 7/2668
(Continued)

OTHER PUBLICATIONS

Wang, Cell Search in W-CDMA, Aug. 8, 200, IEEE Journal on Selected Areas in Communication, vol. 18, No. 8.*

*Primary Examiner* — Eric Nowlin
(74) *Attorney, Agent, or Firm* — Novick, Kim & Lee, PLLC; Jae Youn Kim

(57) ABSTRACT

Provided is a method of processing a Wideband Code Division Multiple Access (WCDMA) signal timing offset for a signal analyzer. The method includes estimating an integer multiple timing offset of WCDMA baseband sample data corresponding to an amount of at least one frame; generating a frequency domain signal which is time delayed corresponding to a fractional timing offset estimation resolution after generating the frequency domain signal by performing a Fast Fourier Transform (FFT) calculation on an already-known reference signal; converting each time-delayed frequency domain signal into a time domain signal by performing an Inverse Fast Fourier Transform (IFFT) calculation on each time-delayed frequency domain signal and calculating a correlation between an input signal from a position of the integer multiple timing offset and the time domain signal; and estimating a delay time leading to a maximum correlation as a fractional timing offset.

8 Claims, 3 Drawing Sheets

(51) Int. Cl.
*H04L 5/00* (2006.01)
*H04L 27/26* (2006.01)

(52) U.S. Cl.
CPC ........ *H04L 5/0021* (2013.01); *H04L 27/2672* (2013.01); *H04L 27/2675* (2013.01)

(58) Field of Classification Search
CPC ....... H04B 1/7087; H04B 1/71; H04L 5/0021; H04L 27/2656; H04L 27/2672; H04L 27/2675; H04L 2027/0067; H04W 36/0072; H04W 36/14; H04W 88/06; H04W 56/00; H04W 56/001; H04W 56/0045
See application file for complete search history.

(56) References Cited

U.S. PATENT DOCUMENTS

| | | | | |
|---|---|---|---|---|
| 5,732,113 | A * | 3/1998 | Schmidl | H04L 5/0048 375/354 |
| 5,799,038 | A * | 8/1998 | Nowara | H04B 1/707 370/203 |
| 5,805,583 | A * | 9/1998 | Rakib | H03M 13/256 348/E7.078 |
| 5,940,384 | A * | 8/1999 | Carney | H04W 88/08 370/320 |
| 6,058,101 | A * | 5/2000 | Huang | H04L 27/2656 370/208 |
| 6,091,703 | A * | 7/2000 | Saunders | H04B 7/216 370/210 |
| 6,118,767 | A * | 9/2000 | Shen | H04B 1/7097 370/252 |
| 6,208,842 | B1 * | 3/2001 | Henderson | H04B 17/309 375/344 |
| 6,243,369 | B1 * | 6/2001 | Grimwood | H04J 3/0682 370/335 |
| 6,266,361 | B1 * | 7/2001 | Huang | H04B 1/7075 375/140 |
| 6,356,555 | B1 * | 3/2002 | Rakib | H03M 13/256 348/E7.07 |
| 6,359,878 | B1 * | 3/2002 | Lakkis | H04L 7/027 370/342 |
| 6,363,049 | B1 * | 3/2002 | Chung | H04B 1/7075 370/210 |
| 6,459,745 | B1 * | 10/2002 | Moose | H04L 27/2613 375/262 |
| 6,507,602 | B1 * | 1/2003 | Dent | H04B 1/7093 370/290 |
| 6,591,100 | B1 * | 7/2003 | Dent | H04W 48/16 455/161.2 |
| 6,768,780 | B1 * | 7/2004 | Lakkis | H04L 7/027 375/355 |
| 6,778,591 | B2 * | 8/2004 | Sato | H04B 1/70754 375/140 |
| 6,785,321 | B1 * | 8/2004 | Yang | H04B 1/7085 342/357.66 |
| 6,876,645 | B1 * | 4/2005 | Guey | H04B 1/711 370/342 |
| 6,898,176 | B1 * | 5/2005 | Cruickshank | H04B 1/70752 370/210 |
| 6,934,317 | B1 * | 8/2005 | Dent | H04L 1/0003 375/140 |
| 6,937,617 | B2 * | 8/2005 | Rakib | H03M 13/256 348/E7.07 |
| 6,959,050 | B2 * | 10/2005 | Baum | H04L 27/2662 375/316 |
| 7,010,048 | B1 * | 3/2006 | Shattil | H04B 1/7174 375/130 |
| 7,031,344 | B2 * | 4/2006 | Rakib | H03M 13/256 370/479 |
| 7,035,319 | B2 * | 4/2006 | Thron | H04B 1/7115 375/148 |
| 7,110,387 | B1 * | 9/2006 | Kim | H04L 5/0048 370/210 |
| 7,120,854 | B2 * | 10/2006 | Lu | H04L 7/048 714/784 |
| 7,126,981 | B2 * | 10/2006 | Ho | H04B 1/70735 375/147 |
| 7,133,479 | B2 * | 11/2006 | Lee | H04L 27/2659 375/354 |
| 7,142,553 | B1 * | 11/2006 | Ojard | H04L 1/0054 370/421 |
| 7,161,927 | B2 * | 1/2007 | Wu | H04L 5/026 370/342 |
| 7,215,636 | B2 * | 5/2007 | Seo | H04L 27/2662 370/208 |
| 7,272,167 | B2 * | 9/2007 | Song | H04B 1/7085 375/149 |
| 7,283,600 | B2 * | 10/2007 | Nitsch | H04B 1/70752 375/343 |
| 7,295,595 | B2 * | 11/2007 | Stehle | H04B 1/70752 370/210 |
| 7,308,063 | B2 * | 12/2007 | Priotti | H04L 27/266 370/491 |
| 7,324,432 | B1 * | 1/2008 | Kim | H04L 27/0014 370/208 |
| 7,336,599 | B2 * | 2/2008 | Hwang | H04B 1/71052 370/208 |
| 7,386,070 | B2 * | 6/2008 | Zhang | H04B 15/04 324/620 |
| 7,403,508 | B1 * | 7/2008 | Miao | H04B 1/692 370/335 |
| 7,443,904 | B2 * | 10/2008 | Choi | H04B 1/707 375/130 |
| 7,573,961 | B2 * | 8/2009 | Linnartz | H04B 7/0848 342/127 |
| 7,590,193 | B2 * | 9/2009 | Han | H04L 27/266 375/316 |
| 7,599,420 | B2 * | 10/2009 | Forenza | H04B 7/0452 370/278 |
| 7,613,104 | B2 * | 11/2009 | Bhatt | H04L 27/2656 370/208 |
| 7,649,927 | B1 * | 1/2010 | Anvari | H04L 25/03343 370/206 |
| 7,667,649 | B2 * | 2/2010 | LeFever | H04B 1/7075 342/387 |
| 7,693,129 | B1 * | 4/2010 | Kishore | H04L 27/2657 370/210 |
| 7,733,986 | B2 * | 6/2010 | Fujii | H03L 7/193 375/327 |
| 7,746,941 | B2 * | 6/2010 | Chang | H04L 27/2676 375/260 |
| 7,756,085 | B2 * | 7/2010 | Terasawa | H04B 1/70735 370/335 |
| 7,773,967 | B2 * | 8/2010 | Smith | H04B 1/30 455/114.1 |
| 7,778,336 | B1 * | 8/2010 | Toumpakaris | H04L 27/2659 375/260 |
| 7,848,730 | B2 * | 12/2010 | Hulbert | H04W 16/14 455/402 |
| 7,855,995 | B1 * | 12/2010 | von der Embse | H04L 25/03203 370/335 |
| 7,860,193 | B2 * | 12/2010 | Gupta | H04L 27/2665 375/340 |
| 7,876,858 | B1 * | 1/2011 | Lee | H04L 27/2655 375/259 |
| 7,899,107 | B1 * | 3/2011 | Lee | H04L 27/2675 375/130 |
| 7,907,512 | B1 * | 3/2011 | von der Embse | H04J 13/0048 370/208 |
| 7,969,857 | B2 * | 6/2011 | Wu | H04J 11/0023 370/203 |
| 7,991,077 | B1 * | 8/2011 | Lee | H04L 27/2655 375/150 |
| 8,014,456 | B1 * | 9/2011 | Lee | H04L 27/2655 375/130 |

(56) References Cited

U.S. PATENT DOCUMENTS

| | | | | |
|---|---|---|---|---|
| 8,019,026 B2* | 9/2011 | Maltsev | H04B 1/70757 | 375/143 |
| 8,031,784 B2* | 10/2011 | Lee | H04L 27/2656 | 375/260 |
| 8,050,366 B2* | 11/2011 | Lin | H04L 27/2663 | 375/260 |
| 8,064,330 B2* | 11/2011 | Kandukuri Narayan | H04B 1/707 | 370/210 |
| 8,130,141 B2* | 3/2012 | Pattabiraman | G01S 19/11 | 342/357.29 |
| 8,134,996 B2* | 3/2012 | Onggosanusi | H04J 11/0069 | 370/350 |
| 8,160,491 B2* | 4/2012 | Touboul | H04J 3/0644 | 370/252 |
| 8,175,197 B2* | 5/2012 | Lee | H04L 27/2656 | 375/260 |
| 8,208,920 B2* | 6/2012 | Sampath | H04W 36/0083 | 455/434 |
| 8,305,875 B2* | 11/2012 | Lim | H04J 13/18 | 370/209 |
| 8,331,330 B2* | 12/2012 | Terasawa | H04B 1/70735 | 370/252 |
| 8,411,766 B2* | 4/2013 | Wu | H04L 5/0007 | 375/259 |
| 8,514,829 B2* | 8/2013 | Sun | H04W 72/00 | 370/343 |
| 8,520,778 B2* | 8/2013 | Sameer | H04L 27/2659 | 375/326 |
| 8,537,931 B2* | 9/2013 | Park | H04L 27/2659 | 375/260 |
| 8,565,351 B2* | 10/2013 | Hao | H04B 1/7105 | 375/319 |
| 8,582,691 B2* | 11/2013 | Suzuki | H04J 11/0036 | 375/147 |
| 8,629,803 B2* | 1/2014 | Pattabiraman | G01S 19/11 | 342/357.29 |
| 8,643,540 B2* | 2/2014 | Pattabiraman | G01S 19/11 | 342/357.29 |
| 8,675,677 B2* | 3/2014 | Wu | H04L 5/0007 | 370/436 |
| 8,811,505 B2* | 8/2014 | Zhang | H04L 25/03159 | 375/259 |
| 8,817,771 B1* | 8/2014 | Zhao | H04L 27/2678 | 370/208 |
| 8,861,572 B2* | 10/2014 | Lindoff | H04L 25/03006 | 375/130 |
| 8,929,314 B2* | 1/2015 | Kim | H04W 56/001 | 370/329 |
| 9,036,723 B2* | 5/2015 | Zhang | H04L 27/2601 | 375/259 |
| 9,049,732 B2* | 6/2015 | Fourtet | H04J 1/12 | |
| 9,118,389 B1* | 8/2015 | Rakib | H04J 1/12 | |
| 9,125,061 B2* | 9/2015 | Wu | H04W 16/12 | |
| 9,210,020 B1* | 12/2015 | Guillemette | H04L 27/2621 | |
| 9,210,023 B1* | 12/2015 | Nagaraja | H04L 27/265 | |
| 9,479,218 B2* | 10/2016 | Li | H04B 1/709 | |
| 9,762,288 B2* | 9/2017 | Rakib | H04B 3/32 | |
| 9,825,794 B2* | 11/2017 | Nguyen | H04L 27/265 | |
| 2001/0001616 A1* | 5/2001 | Rakib | H03M 13/256 | 375/259 |
| 2001/0024474 A1* | 9/2001 | Rakib | H03M 13/256 | 375/259 |
| 2001/0036221 A1* | 11/2001 | Sato | H04B 1/70754 | 375/147 |
| 2001/0046266 A1* | 11/2001 | Rakib | H03M 13/256 | 375/259 |
| 2002/0015423 A1* | 2/2002 | Rakib | H03M 13/256 | 370/485 |
| 2002/0065047 A1* | 5/2002 | Moose | H04L 5/0048 | 455/67.11 |
| 2002/0191711 A1* | 12/2002 | Weiss | H03F 1/32 | 375/296 |
| 2003/0002433 A1* | 1/2003 | Wu | H04L 5/026 | 370/203 |
| 2003/0026295 A1* | 2/2003 | Baum | H04L 27/2662 | 370/503 |
| 2003/0147365 A1* | 8/2003 | Terasawa | H04B 1/70735 | 370/335 |
| 2003/0154357 A1* | 8/2003 | Master | G06F 15/7867 | 712/15 |
| 2003/0156603 A1* | 8/2003 | Rakib | H03M 13/256 | 370/485 |
| 2003/0202564 A1* | 10/2003 | Ho | H04B 1/70735 | 375/147 |
| 2003/0227889 A1* | 12/2003 | Wu | H04W 16/12 | 370/335 |
| 2004/0022301 A1* | 2/2004 | Thron | H04B 1/7115 | 375/148 |
| 2004/0052236 A1* | 3/2004 | Hwang | H04B 1/71052 | 370/342 |
| 2004/0120410 A1* | 6/2004 | Priotti | H04L 27/266 | 375/260 |
| 2004/0125772 A9* | 7/2004 | Wu | H04W 16/12 | 370/335 |
| 2004/0128533 A1* | 7/2004 | Choi | H04B 1/707 | 726/28 |
| 2004/0131031 A1* | 7/2004 | Stehle | H04B 1/70752 | 370/335 |
| 2004/0141457 A1* | 7/2004 | Seo | H04L 27/2662 | 370/203 |
| 2004/0208267 A1* | 10/2004 | Lee | H04L 27/2659 | 375/354 |
| 2004/0264584 A1* | 12/2004 | Labs | H04L 27/2659 | 375/260 |
| 2005/0030886 A1* | 2/2005 | Wu | H04J 11/0023 | 370/206 |
| 2005/0044472 A1* | 2/2005 | Lu | H04L 7/048 | 714/784 |
| 2005/0265499 A1* | 12/2005 | Zhang | H04B 15/04 | 375/354 |
| 2006/0018413 A1* | 1/2006 | Gupta | H04L 27/2662 | 375/343 |
| 2006/0023812 A1* | 2/2006 | Thiagarajan | H04L 27/2657 | 375/326 |
| 2006/0039491 A1* | 2/2006 | Han | H04L 27/266 | 375/260 |
| 2006/0114815 A1* | 6/2006 | Hasegawa | H04B 1/707 | 370/208 |
| 2006/0182197 A1* | 8/2006 | Godambe | H04L 25/06 | 375/297 |
| 2006/0268964 A1* | 11/2006 | Song | H04B 1/7085 | 375/148 |
| 2007/0091785 A1* | 4/2007 | Lindoff | H04J 11/0069 | 370/203 |
| 2007/0133390 A1* | 6/2007 | Luo | H04B 1/7083 | 370/208 |
| 2007/0195914 A1* | 8/2007 | Chang | H04L 27/2662 | 375/343 |
| 2007/0202901 A1* | 8/2007 | Hulbert | H04W 16/14 | 455/501 |
| 2007/0217534 A1* | 9/2007 | Lee | H04L 27/2656 | 375/260 |
| 2007/0217552 A1* | 9/2007 | Lee | H04L 27/2656 | 375/343 |
| 2007/0223604 A1* | 9/2007 | Miyano | H04B 1/707 | 375/260 |
| 2007/0250638 A1* | 10/2007 | Kiran | H04L 1/0006 | 709/236 |
| 2007/0280098 A1* | 12/2007 | Bhatt | H04L 27/2656 | 370/208 |
| 2008/0019350 A1* | 1/2008 | Onggosanusi | H04J 11/0069 | 370/350 |
| 2008/0056116 A1* | 3/2008 | Ge | H04L 27/2657 | 370/203 |
| 2008/0075212 A1* | 3/2008 | Chun | H04L 7/042 | 375/354 |

(56) References Cited

U.S. PATENT DOCUMENTS

| | | | |
|---|---|---|---|
| 2008/0130790 A1* | 6/2008 | Forenza | H04B 7/0452 375/299 |
| 2008/0232496 A1* | 9/2008 | Lin | H04L 27/2663 375/260 |
| 2008/0291820 A1* | 11/2008 | Lim | H04J 13/18 370/209 |
| 2009/0029710 A1* | 1/2009 | Ochiai | H04L 5/023 455/450 |
| 2009/0068974 A1* | 3/2009 | Smith | H04B 1/30 455/304 |
| 2009/0122771 A1* | 5/2009 | Cai | H04J 11/00 370/338 |
| 2009/0149132 A1* | 6/2009 | LeFever | H04B 1/7075 455/67.11 |
| 2009/0245089 A1* | 10/2009 | Kandukuri Narayan | H04B 1/707 370/210 |
| 2009/0247156 A1* | 10/2009 | Sampath | H04W 36/0083 455/434 |
| 2009/0257480 A1* | 10/2009 | Wu | H04L 5/0007 375/211 |
| 2009/0279503 A1* | 11/2009 | Chin | H04W 36/0072 370/331 |
| 2009/0316053 A1* | 12/2009 | Huang | H04N 5/46 348/726 |
| 2010/0029295 A1* | 2/2010 | Touboul | H04J 11/0093 455/456.1 |
| 2010/0087206 A1* | 4/2010 | Touboul | H04J 3/0644 455/456.1 |
| 2010/0202316 A1* | 8/2010 | Terasawa | H04B 1/70735 370/252 |
| 2010/0205510 A1* | 8/2010 | von der Embse | G06F 17/148 714/776 |
| 2010/0296611 A1* | 11/2010 | Maltsev | H04B 1/70757 375/343 |
| 2010/0309890 A1* | 12/2010 | Lee | H04B 1/7113 370/336 |
| 2011/0110445 A1* | 5/2011 | Sameer | H04L 27/2659 375/260 |
| 2011/0135018 A1* | 6/2011 | Zhang | H04L 25/03159 375/259 |
| 2011/0228689 A1* | 9/2011 | Wu | H04L 5/0007 370/252 |
| 2012/0002767 A1* | 1/2012 | Anandakumar | H04L 27/2665 375/346 |
| 2012/0027048 A1* | 2/2012 | Lindoff | H04L 25/03006 375/140 |
| 2012/0163222 A1* | 6/2012 | Islam | G01S 5/0205 370/252 |
| 2012/0275472 A1* | 11/2012 | Hao | H04B 1/7105 370/479 |
| 2013/0057436 A1* | 3/2013 | Krasner | G01S 19/11 342/464 |
| 2013/0120188 A1* | 5/2013 | Pattabiraman | G01S 19/11 342/357.29 |
| 2013/0142191 A1* | 6/2013 | Fourtet | H04J 1/12 370/344 |
| 2013/0182656 A1* | 7/2013 | Kim | H04W 56/001 370/329 |
| 2014/0079164 A1* | 3/2014 | Zhang | H04L 27/2601 375/343 |
| 2014/0161000 A1* | 6/2014 | Fazlollahi | H04B 3/32 370/280 |
| 2014/0314128 A1* | 10/2014 | Li | H04B 1/709 375/150 |
| 2015/0236882 A1* | 8/2015 | Bertrand | H04L 27/2613 370/329 |
| 2015/0289198 A1* | 10/2015 | Boixadera | H04W 48/16 455/552.1 |
| 2016/0142236 A1* | 5/2016 | Nguyen | H04L 27/265 375/260 |
| 2017/0195155 A1* | 7/2017 | Zhang | H04L 5/0007 |
| 2017/0201405 A1* | 7/2017 | Huang | H04L 5/0007 |
| 2017/0237597 A1* | 8/2017 | Joung | H04B 1/7087 370/342 |
| 2017/0245231 A1* | 8/2017 | Huang | H04W 56/0005 |

FOREIGN PATENT DOCUMENTS

| | | | | |
|---|---|---|---|---|
| KR | 10-2004-0070693 A | | 8/2004 | |
| KR | 20060001006 A | * | 1/2006 | H04B 1/7075 |
| KR | 10-2010-0006111 A | | 1/2010 | |
| KR | 10-2010-0130659 A | | 12/2010 | |
| KR | 20170096725 A | * | 8/2017 | H04B 1/7087 |
| WO | WO 2010035623 A1 | * | 4/2010 | H04J 11/0036 |

* cited by examiner

METHOD OF PROCESSING WCDMA SIGNAL TIMING OFFSET FOR SIGNAL ANALYZING EQUIPMENT

BACKGROUND

The embodiment relates to a method of processing a Wideband Code Division Multiple Access (WCDMA) signal timing offset for a signal analyzer, and more particularly, to a method of processing a WCDMA signal timing offset for a signal analyzer, which is capable of estimating and compensating for a timing offset at a high accuracy within 1% EVM (0.1 sample) by using Fast Fourier Transform (FFT) or Inverse Fourier Transform (IFFT) and a fractional RRC filter even while using a low sampling frequency of twice the WCDMA chip rate.

As well known in the art, WCDMA (Wideband Code Division Multiple Access) defined in 3GPP TS.25 standard, which is one of $3^{rd}$ generation wireless communication systems, is an asynchronous mobile communication scheme having a chip rate of Fc=3.84 Mcps.

FIG. 1 is a view illustrating a radio frame structure of the WCDMA system including a synchronous channel. As shown in FIG. 1, according to the radio frame structure of the WCDMA system, chips are transmitted within a TTI (Transmission Time Interval) and each TTI includes one radio frame to 8 radio frames. Each radio frame is a duration of 10 ms and is divided into 15 slots. The slot includes 2560 chips. Thus, the TTI may include 15 to 120 slots.

Meanwhile, the primary synchronization channel includes a modulation code of 256 chips. The same modulation code is transmitted through primary synchronization channel at the same location in each slot. Since the secondary synchronization channel is a code sequence formed by combining modulation codes each having 256 chips, which correspond to 15 slots of one radio frame, the modulation codes of the secondary synchronization channel each is transmitted in parallel with the codes of the first synchronization channel every slot and are configured to be different from each other every slot.

The WCDMA system having the frame structure described above performs the cell search and physical layer synchronization to detect a downlink WCDMA signal through following three steps.

First step: The slot synchronization is obtained by synchronizing a sample/chip boundary through PSCH.

Second step: The frame synchronization and scrambling code are obtained through SSCH.

Third step: Fractional sample/chip boundary synchronization, scrambling code index synchronization and channel estimation through CPICH (Common Pilot Channel).

Until the CPICH is decoded, it is impossible to estimate the channel and exactly detect a remaining DPxCH signal such as s DPDCH (Dedicated Physical Data Channel) signal or a DPCCH (Dedicated Physical Control Channel) signal. The frequency, timing and phase offsets are estimated and compensated by using the detected CPICH signal so that the channel is estimated.

The WCDMA communication technique uses a symbol modulation scheme of a chip rate very higher than a data rate. In this case, since the sampling timing offset must be very smaller that the data sampling timing offset, the demodulation performance is very sensitive to the timing offset (error).

According to the related art, a maximum correlation value search scheme has been mainly used to estimate a timing offset. Thus, a signal analyzer according to the related art is required to perform an over sampling, which is 40 to 80 times the chip rate of 3.84 MHz of the WCDMA system, to maintain the condition of 1% EVM at the sampling frequency of 30.72 (=3.84*8) MHz, that is, the timing synchronization within 0.1 sample, so that too much resource is inefficiently consumed.

DOCUMENT OF RELATED ART

Patent Document

Patent document 1: Korean Unexamined Patent Publication No. 10-2004-0070693 (Title: Apparatus for acquiring synchronization in asynchronous next-generation mobile communication system and method thereof)

Patent document 2: Korean Unexamined Patent Publication No. 10-2010-0006111 (Title: Method of analyzing a signal for a mobile communication system)

Patent document 3: Korean Unexamined Patent Publication No. 10-2010-0130659 (Title: method and apparatus for Time tracking of mobile communication receiver for channel estimation)

SUMMARY

To satisfy the requirement described above, an object of the embodiment is to provide a method of processing a WCDMA signal timing offset for a signal analyzer, which is capable of estimating and compensating a timing offset at a high accuracy within 1% EVM (0.1 sample) by using FFT/IFFT and a fractional RRC filter even while using a low sampling frequency of twice the WCDMA chip rate.

According to an embodiment, there is provided a method of processing a WCDMA signal timing offset for a signal analyzer, which includes: estimating an integer multiple timing offset of WCDMA baseband sample data corresponding to an amount of at least one frame; generating a frequency domain signal which is time delayed corresponding to a fractional timing offset estimation resolution after generating the frequency domain signal by performing an FFT calculation on an already-known reference signal; converting each time-delayed frequency domain signal into a time domain signal by performing an IFFT calculation on each time-delayed frequency domain signal and calculating a correlation between an input signal from a position of the integer multiple timing offset and the time domain signal; and estimating a delay time leading to a maximum correlation as a fractional timing offset.

The frequency domain signal $R(\omega)$ is obtained by performing the FFT calculation on a PSCH $r(t)$ through a following equation, $$R(\omega)=FFT[r(t),N_{ft}]$$

wherein $N_{ft}$ is a number of FFT samples.

The PSCH $r(t)$ is a signal RRC-filtered at a sampling rate which is twice a WCDMA chip rate.

The frequency domain signal $R(w)$ is obtained by performing the FFT calculation on a CPICH $r(t)$ through a following equation, $$R(\omega)=FFT[r(t),N_{ft}],$$

wherein $N_{ft}$ is a number of FFT samples.

The CPICH $r(t)$ is a signal RRC-filtered at a sampling rate which is twice a WCDMA chip rate.

Each delayed time domain signal is obtained by a following equation, $$r(t-\tau_1{}^*i)=IFFT[R(\omega)e^{j^*\omega^*\tau_1{}^*i}]$$

wherein $\tau_1{}^\wedge=T_c/N_1$, $I=0, \ldots, N_1$, $r'(t-\tau_1{}^\wedge{}^*i)$ is a conjugate complex number of $r(t-\tau_1{}^\wedge{}^*i)$, and $N_1$ is a fractional timing offset estimation resolution.

The correlation y(t) is obtained by a following equation, $$y(t)=\Sigma[x(t)*r'(t-\tau_1{}^\wedge{}^*i)].$$

The method further includes compensating for the fractional timing offset by applying the estimated fractional timing offset to a fractional RRC filter as a compensation coefficient.

The RRC filter is operated according to a following equation, $$RC_0(t) = \frac{\sin\left(\pi\frac{t}{T_C}(1-\alpha)\right)+4\alpha\frac{t}{T_C}\cos\left(\pi\frac{t}{T_C}(1+\alpha)\right)}{\pi\frac{t}{T_C}\left(1-\left(4\alpha\frac{t}{T_C}\right)^2\right)}$$

wherein $t=t-\tau_1*i_{maxc}$.

According to the method of processing a WCDMA signal timing offset for a signal analyzer of the embodiment, a timing offset may be estimated and compensated at a high accuracy within 1% EVM (0.1 sample) by using FFT/IFFT and a fractional RRC filter even while using a low sampling frequency of twice the WCDMA chip rate.

DETAILED DESCRIPTION OF THE EMBODIMENTS

Hereinafter, a method of processing a WCDMA signal timing offset for a signal analyzer according to a preferable embodiment will be described in detail with reference to accompanying drawings.

First, to receive and analyze a WCDMA signal, timing, frequency and phase synchronizations are required and specifically, at the sampling frequency of 30.72 MHz (the LTE clock frequency is used to compatible with an LTE signal analyzer), the timing, frequency and phase synchronizations are required to be satisfied within 0.1 sample, 1 Hz and 1°.

To this end, according to an embodiment, there is proposed a scheme capable of rapidly securing the timing synchronization by using FFT/IFFT while the sampling rate (2*Fc=7.68 MHz), which is about twice the chip rate Fc of the WCDMA system, is used.

Figure 1:
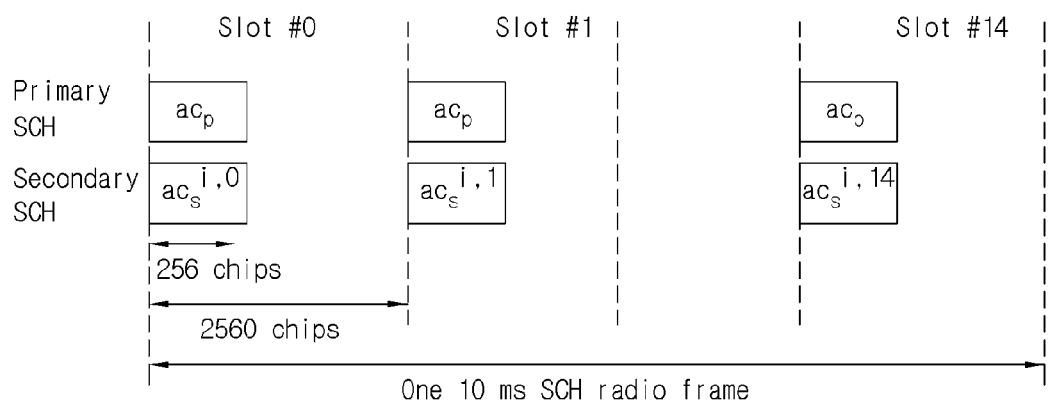
FIG. 1 is a view illustrating a structure of a wireless frame of a WCDMA system including a synchronization channel.
Figure 2:
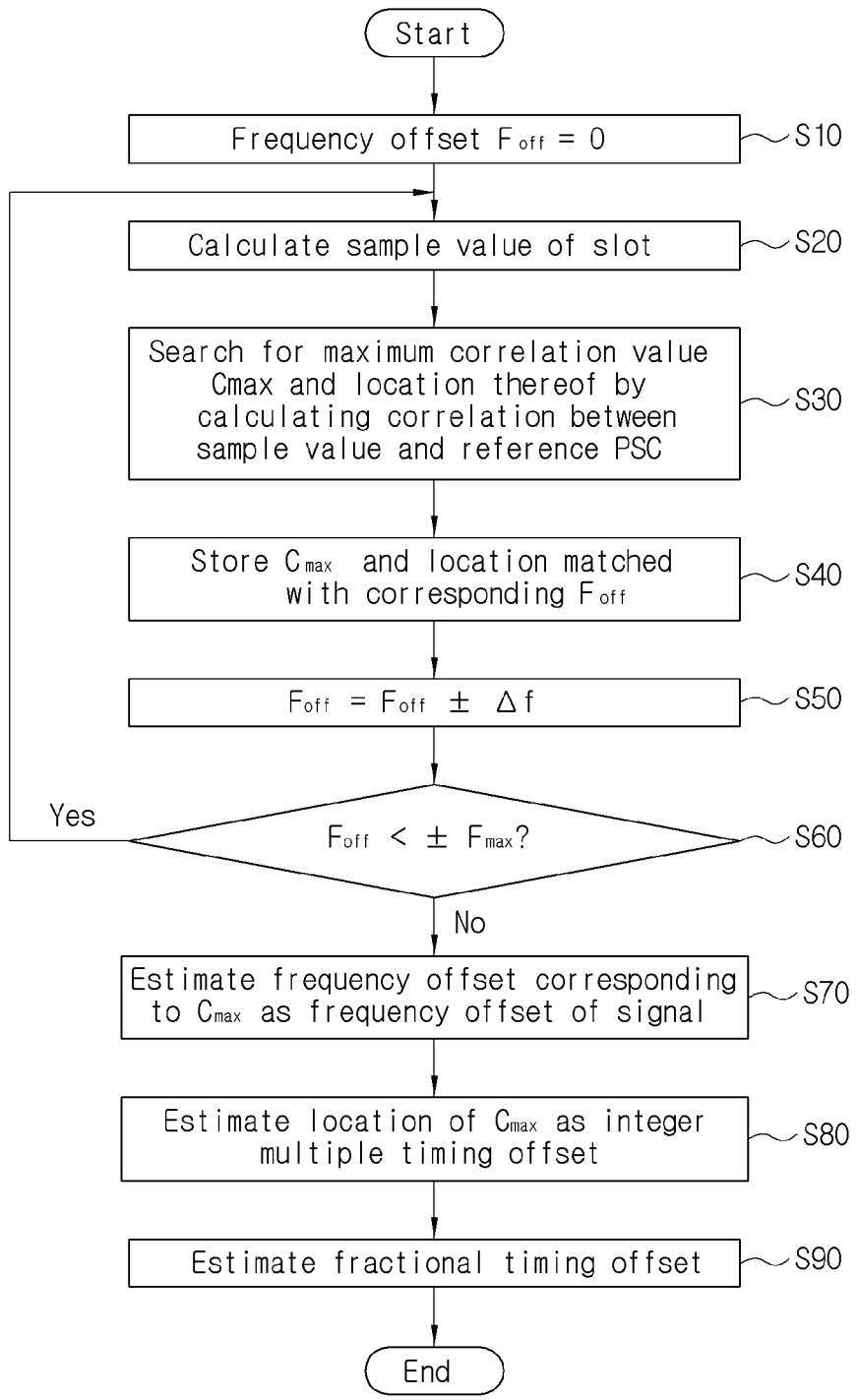
FIG. 2 is a flowchart illustrating a method of processing a WCDMA signal timing offset for a signal analyzer according to an embodiment.

FIG. 2 is a flowchart illustrating a method of processing a WCDMA signal timing offset for a signal analyzer according to an embodiment.

First, a signal analyzer according to an embodiment receives a WCDMA signal. The signal analyzer down-converts the WCDMA signal into an analog baseband I/Q signal and converts the analog baseband I/Q signal into digital data again. For example, the signal analyzer converts the analog baseband I/Q signal into I/Q sample data of a sampling rate of 30.72 MHz and a resolution of 16-bit and captures the I/Q sample data. In the following description, the I/Q sample data may not be separately explained. In this case, in step S10, the captured sample data are matched-filtered. In this case, an RRC (Root Raised Cosine) filtering operation is performed.

As well known in the art, since the RRC filtering demodulates a signal by utilizing spectrum aliasing characteristics in digital domain, a receiver is required to perform over sampling. In this case, since the minimum over sampling rate is 2, after the original sampling rate is decimated to 4:1, the RRC filtering is performed to use the minimum over rate.

In this case, the first step described above, that is, the PSC synchronization is performed, and at the same time, the timing and frequency offset compensations are performed. To this end, in the step S10, the frequency offset $F_{off}$ is set into 0, and then, in step S20, a sampling value in units of slots is calculated. Preferably, to more stably perform PSC detection, after the sample values in units of slots in one wireless frame, in which total 15 slots exist, are calculated, the average value of them is used.

Next, in step S30, the correlation between the sample values in units of slots obtained in step S20 and a reference PSC sample (sampled at twice of the chip rate) defined in the standard is calculated to search for the maximum correlation value $C_{max}$ and the location thereof. Then, in step S40, the maximum correlation value $C_{max}$ and the location thereof are matched with the corresponding frequency offset $F_{off}$ to be stored.

Next, in steps S50 and S60, in a state that a new frequency offset is set by increasing or decreasing a current frequency offset by a predetermined increment $\Delta f$ (increased in once, or decreased in another time), the steps S20 to S60 are repeated until the new frequency offset reaches the predetermined maximum frequency offset $\pm F_{max}$. In this case, preferably, the increment $\Delta f$ of the frequency offset is set as 50 Hz which is half of 100 Hz in consideration of the time length 10 ms of the wireless frame and the maximum frequency offset $F_{max}$ is set as 750 Hz (15*100 Hz*½) in consideration of the number of PSCs of 15 included in one wireless frame.

As described above, in the state that the maximum correlation value $C_{max}$ with respect to all frequency offsets and the location thereof are calculated and stored, in step S70, after confirming the maximum correlation value $C_{max}$ and the location, a frequency offset matched with the maximum correlation value $C_{max}$ and the location is estimated as the frequency offset of a received signal. In addition, the integer multiple timing offset of the PSC is estimated based on the sample location of the maximum correlation value $C_{max}$.

Meanwhile, as expressed as the following Equation 1 according to an embodiment, the correlation calculation of step S30 may be performed in frequency domain by using the Fourier transform characteristics. When the correlation calculation is performed in frequency domain, an FFT algorithm may be applied thereto. As a result, as the number of samples is increased, the calculation may be effectively performed with a small amount of computation.

The correlation calculation for estimating a timing offset may be performed by following Equation 1.

$$R(\tau) = E[x(t+\tau)*s(t)'] \qquad \text{[Equation 1]}$$
$$= F^{-1}\{F[x(t+\tau)]*F[s(t)^{10}]\}$$

In the Equation 1, $R(\tau)$ is a correlation value, $x(t+\tau)$ is an input signal delayed for time $\tau$ (corresponding to one sample when the embodiment is based on 512 samples), s(t)' is a reference signal, that is, a conjugate complex number of PSC having 512 samples, F represents an FFT calculation, and $F^{-1}$ represents an IFFT calculation.

The following Table 1 is a table of comparing an amount of computation according to the correlation calculation scheme of the embodiment with that of the related art. According to the embodiment, as shown in Table 1, when based on 512 samples, the amount of computation is reduced to 57 times. When based on 4096 samples, the amount of computation is reduced to 341 times

TABLE 1

| Related art | Embodiment | Remarks |
|---|---|---|
| 512 * 512 | 512 * log$_2$(512) | 57 times |
| 4096 * 4096 | 4096 * log$_2$(4096) | 341 times |

As described above, when the frequency offset estimation and the integer multiple timing offset estimation are completed, in step S90, a fractional timing offset is estimated based on the location of the estimated integer multiple timing offset. To this end, FFT characteristics expressed as following Equations 2 and 3 are used.

$$FFT[r(t-t_0)] = FFT[r(t)]e^{j*\omega*(-t_0)} = R(\omega)e^{j*\omega*(-t_0)} \quad \text{[Equation 2]}$$

$$r(t-t_0) = IFFT[R(\omega)e^{j*\omega*(-t_0)}] \quad \text{[Equation 3]}$$

When using Equations 2 and 3, if a signal R(w) is previously generated and the sample interval to is set as $T_c(=1/F_c)/N_1$, only a required time delay signal may be rapidly generated through the IFFT calculation, where $N_1$ is a fractional timing offset estimation resolution which may be predetermined as 128 in the embodiment. When the location of the maximum correlation value is determined by calculating the correlation between the time-delayed signal and the input signal, the location may be immediately estimated as the fractional timing offset. This relation may be expressed as follows with PSCH as a reference signal.

First, a frequency domain signal R(ω) for PSCH r(t) previously defined in the standard is generated according to following Equation 4.

$$R(\omega) = FFT[r(t), N_{ft}] \quad \text{[Equation 4]}$$

In the Equation 4, $N_{ft}$ is the number of samples of FFT. For example, $N_{ft}$ may be set as 4096. In addition, a PSCH signal, which is RRC filtered at the sampling rate of twice the chip rate, is used as r(t).

Next, the correlation between the input signal x(t) RRC-filtered at the sampling rate of twice the chip rate and $r(t-\tau_1\hat{\,}*i)$ is calculated. $r(t-\tau_1\hat{\,}*i)$ and the correlation may be obtained through following Equations 5 and 6.

$$r(t-\tau_1\hat{\,}*i) = IFFT[R(\omega)e^{j*\omega*\tau_1\hat{\,}*i}], \tau_1\hat{\,} = T_c/N_1, i=0, \ldots, N_1 \quad \text{[Equation 5]}$$

$$y(t) = \Sigma[x(t)*r'(t-\tau_1\hat{\,}*i)] \quad \text{[Equation 6]}$$

In Equation 6, $r'(t-\tau_1\hat{\,}*i)$ is the conjugate complex number of $r(t-\tau_1\hat{\,}*i)$. The location $i(i_{maxc})$ at which the correlation obtained through Equation 6 is maximized is obtained. This location is the fractional timing offset.

Figure 3:
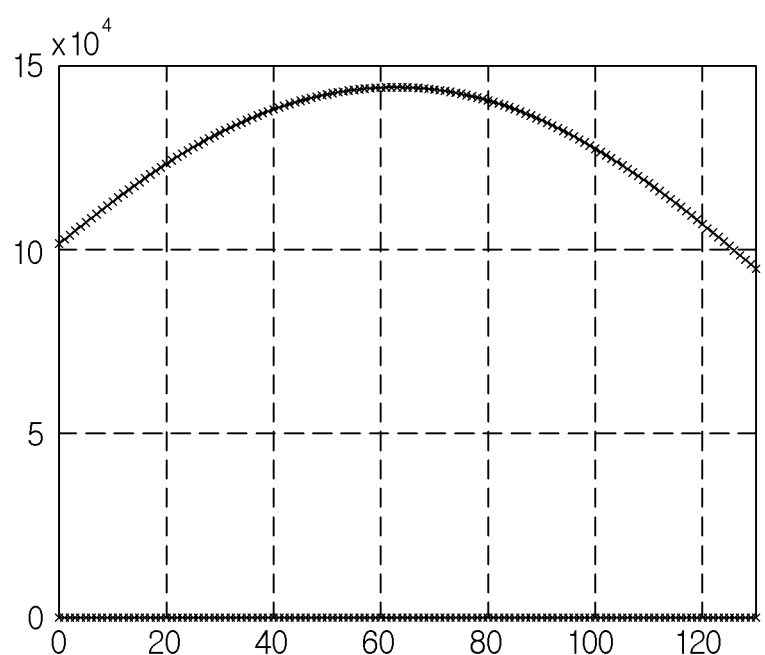
FIG. 3 is a graph illustrating a correlation obtained with a fractional timing offset estimation resolution of $N_1=128$ according to an embodiment.

FIG. 3 is a graph illustrating a correlation obtained with a fractional timing offset estimation resolution of $N_1=128$ through Equation 6 according to an embodiment. It may be understood through FIG. 3 that the fractional timing offset is about $60\tau_1$.

When the fractional timing offset is estimated as described above, the fractional timing offset is applied to the RRC filter as a compensation coefficient, so that the fractional timing offset may be exactly compensated.

$$RC_0(t) = \frac{\sin\left(\pi\frac{t}{T_C}(1-\alpha)\right) + 4\alpha\frac{t}{T_C}\cos\left(\pi\frac{t}{T_C}(1+\alpha)^{20}\right)}{\pi\frac{t}{T_C}\left(1-\left(4\alpha\frac{t}{T_C}\right)^2\right)} \quad \text{[Equation 7]}$$

The Equation 7 is a mathematical expression of the RRC filtering defined in 3GPP TS.25.101/104. In the Equation 7, when t is replaced with $t-\tau_1*i_{maxc}$, the fractional timing offset may be exactly compensated.

Meanwhile, since the fractional timing offset may not be exactly detected through the PSCH due to the phase offset, if CPICH is used, the fractional timing offset may be more exactly detected. Even in this case, only the reference signal is replaced with the CPICH and the fractional timing offset may be estimated through the same method as that described above.

The method of processing a WCDMA signal timing offset for a signal analyzer described with reference to accompanying drawings in this disclosure is for an illustrative purpose only, and the embodiment is not limited thereto. Thus, it should be understood that numerous other modifications and embodiments can be devised by those skilled in the art within the spirit and scope of the embodiment and they will fall within the scope of the embodiment.

What is claimed is:

1. A method of processing a Wideband Code Division Multiple Access (WCDMA) signal timing offset for a signal analyzer, the method comprising:
   estimating an integer multiple timing offset of WCDMA baseband sample data corresponding to an amount of at least one frame;
   generating a frequency domain signal by performing a Fast Fourier Transform (FFT) calculation on an already-known reference signal which is Root Raised Cosine (RRC)-filtered at a sampling rate;
   generating at least one time-delayed frequency domain signal corresponding to at least one reference signal which is time delayed by a fractional timing offset estimation resolution;
   converting the at least one time-delayed frequency domain signal into at least one time domain signal by performing an Inverse Fast Fourier Transform (IFFT) calculation on the at least one time-delayed frequency domain signal and calculating at least one correlation between at least one input signal from a position of the integer multiple timing offset and the at least one time domain signal; and
   estimating a delay time leading to a maximum correlation of the at least one correlation as a fractional timing offset,
   wherein the at least one delayed time domain signal is obtained by a following equation, $$r(t-\tau_1\hat{\,}*i) = IFFT[R(\omega)e^{j*\omega*\tau_1\hat{\,}*i}]$$

wherein $\tau_1\hat{\,} = T_c/N_1$, I=0, . . . , $N_1$, $r'(t-\tau_1\hat{\,}*i)$, and $N_1$ is a fractional timing offset estimation resolution.

2. The method of claim 1, wherein the frequency domain signal R(ω) is obtained by performing the FFT calculation on a PSCH r(t) through a following equation, $$R(\omega) = FFT[r(t), N_{ft}]$$

wherein $N_{ft}$ is a number of FFT samples.

3. The method of claim 2, wherein the PSCH r(t) is a signal RRC-filtered at the sampling rate which is twice a WCDMA chip rate.

4. The method of claim 1, wherein the frequency domain signal R(ω) is obtained by performing the FFT calculation on a CPICH r(t) through a following equation, $$R(\omega)=\text{FFT}[r(t),N_{ft}],$$

wherein $N_{ft}$ is a number of FFT samples.

5. The method of claim 4, wherein the CPICH r(t) is a signal RRC-filtered at the sampling rate which is twice a WCDMA chip rate.

6. The method of claim 1, wherein the at least one correlation y(t) is obtained by a following equation, $$y(t)=\Sigma[x(t)*r'(t-\tau_1{}^{\wedge}*i)].$$

7. The method of claim 6, further comprising compensating for the fractional timing offset by applying the estimated fractional timing offset to a fractional RRC filter as a compensation coefficient.

8. The method of claim 7, wherein the RRC filter is operated according to a following equation, $$RC_0(t) = \frac{\sin\left(\pi \frac{t}{T_C}(1-\alpha)\right) + 4\alpha \frac{t}{T_C}\cos\left(\pi \frac{t}{T_C}(1+\alpha)\right)}{\pi \frac{t}{T_C}\left(1 - \left(4\alpha \frac{t}{T_C}\right)^2\right)}$$

wherein $t = t - \tau_1 * i_{maxc}$.

* * * * *